(12) United States Patent
Ueno

(10) Patent No.: US 7,563,998 B2
(45) Date of Patent: Jul. 21, 2009

(54) ELECTRICAL SWITCH APPARATUS FOR A BICYCLE CONTROL DEVICE

(75) Inventor: Koken Ueno, Sakai (JP)

(73) Assignee: Shimano, Inc., Sakai-ku, Sakai, Osaka (JP)

( * ) Notice: Subject to any disclaimer, the term of this patent is extended or adjusted under 35 U.S.C. 154(b) by 657 days.

(21) Appl. No.: 11/420,741

(22) Filed: May 27, 2006

(65) Prior Publication Data
US 2007/0000343 A1 Jan. 4, 2007

(30) Foreign Application Priority Data
Jun. 14, 2005 (JP) ............................. 2005-173486

(51) Int. Cl.
*H01H 9/06* (2006.01)
(52) U.S. Cl. .................... 200/61.88; 200/466
(58) Field of Classification Search .............. 200/17 R, 200/61.27, 61.28, 61.3, 61.85, 61.86, 61.88, 200/61.87, 446, 447, 448, 451, 462, 465, 200/466, 332, 332.1, 332.2, 335, 329, 330, 200/61.54
See application file for complete search history.

(56) References Cited

U.S. PATENT DOCUMENTS

| | | | | |
|---|---|---|---|---|
| 3,957,131 | A * | 5/1976 | Perkins | 180/272 |
| 4,174,473 | A * | 11/1979 | Brenneman | 200/332.2 |
| 4,230,919 | A * | 10/1980 | Schantz et al. | 200/462 |
| 4,916,274 | A * | 4/1990 | Hawley et al. | 200/457 |
| 6,051,800 | A * | 4/2000 | Barrett | 200/454 |
| 6,734,376 | B2 * | 5/2004 | Ichida et al. | 200/4 |
| 6,835,904 | B2 * | 12/2004 | McGuire et al. | 200/61.87 |

FOREIGN PATENT DOCUMENTS

| | | | |
|---|---|---|---|
| DE | 10030959 | A1 | 1/2002 |
| EP | 1262399 | A1 | 12/2002 |
| EP | 1264765 | A1 | 12/2002 |
| EP | 1362552 | A1 | 11/2003 |
| EP | 1398266 | A2 | 3/2004 |
| JP | 3170965 | B2 | 3/2001 |
| JP | 2001-087566 | A1 | 4/2001 |
| JP | 2001-351416 | A1 | 12/2001 |

(Continued)

OTHER PUBLICATIONS

European search report for EP 06012297, the European application that is the equivalent of this application, dated Sep. 13, 2006.

*Primary Examiner*—Michael A Friedhofer
(74) *Attorney, Agent, or Firm*—James A. Deland

(57) ABSTRACT

An electrical switch apparatus for a bicycle control device comprises a mounting member structured to be mounted to a bicycle, an operating member supported by the mounting member for movement between an operating member start position and an operating member operating position, a first piezoelectric element supported by the mounting member, and a first striking member supported by the mounting member for movement between a first striking member start position and a first striking member striking position. The first striking member is operatively coupled to the first operating member such that the first striking member moves from the first striking member start position to the first striking member striking position to strike the first piezoelectric element in response to movement of the first operating member from the first operating member start position to the first operating member operating position.

26 Claims, 6 Drawing Sheets

FOREIGN PATENT DOCUMENTS

| | | |
|---|---|---|
| JP | 2003-007491 A1 | 1/2003 |
| JP | 2003-007492 A1 | 1/2003 |
| JP | 2003-133971 A1 | 5/2003 |
| JP | 3616386 B2 | 11/2004 |
| WO | 00/01574 A1 | 1/2000 |

* cited by examiner

ELECTRICAL SWITCH APPARATUS FOR A BICYCLE CONTROL DEVICE

BACKGROUND OF THE INVENTION

The present invention is directed to bicycles and, more particularly, to an electrical switch apparatus for a bicycle control device.

In recent years, bicycles have been equipped with an increasing number of electrically operated devices operated by various electrical switches. For example, Japanese Laid Open Patent No. 2004-159490 discloses an electrically operated bicycle transmission controlled by an electrical shift switch that is connected to a shift control unit by electrical wiring. A shift signal is communicated to the shift control unit in response to operation of the shift switch, and the shift control unit operates the bicycle transmission accordingly.

When the shift switch is connected to the shift control unit with wiring, it is difficult to run the wiring along the bicycle, and the wiring detracts from the appearance of the bicycle. To alleviate such problems, it may be desirable to transmit the shift signal wirelessly from the shift switch to the shift control unit. However, if a power supply such as a battery is used to operate the wireless transmitter, the battery tends to become exhausted over time.

SUMMARY OF THE INVENTION

The present invention is directed to various features of an electrical switch apparatus for a bicycle control device. In one embodiment, an electrical switch apparatus for a bicycle control device comprises a mounting member structured to be mounted to a bicycle, an operating member supported by the mounting member for movement between an operating member start position and an operating member operating position, a first piezoelectric element supported by the mounting member, and a first striking member supported by the mounting member for movement between a first striking member start position and a first striking member striking position. The first striking member is operatively coupled to the first operating member such that the first striking member moves from the first striking member start position to the first striking member striking position to strike the first piezoelectric element in response to movement of the first operating member from the first operating member start position to the first operating member operating position.

In another embodiment, an electrical switch apparatus for a bicycle control device comprises a mounting member structured to be mounted to a bicycle, an operating member supported by the mounting member for movement between an operating member start position and an operating member operating position, an electrical element supported by the mounting member, a contact member supported by the mounting member for movement between a contact member start position and a contact member contacting position, and a biasing unit that applies a vector of biasing force to the contacting member. The biasing unit is operatively coupled to the operating member such that the contacting member moves from the contacting member start position to the contacting member contacting position to move the electrical element in response to movement of the operating member from the operating member start position to the operating member operating position. The contacting member is supported to the mounting member for pivoting around an axis, and the vector of biasing force applied to the contacting member crosses over the axis as the operating member moves from the operating member start position to the operating member operating position.

In another embodiment, an electrical switch apparatus controls movement of a moving bicycle control device. The apparatus comprises a mounting member structured to be mounted to a bicycle, an operating member supported by the mounting member for movement between an operating member start position and an operating member operating position, a piezoelectric element supported by the mounting member, and a control circuit. The operating member causes the piezoelectric element to move and generate a control signal for the bicycle control device when the operating member moves to the operating member operating position, and the control circuit provides a signal to move the bicycle control device in response to the control signal.

Additional inventive features will become apparent from the description below, and such features alone or in combination with the above features may form the basis of further inventions as recited in the claims and their equivalents.

DETAILED DESCRIPTION OF THE EMBODIMENTS

Figure 1:
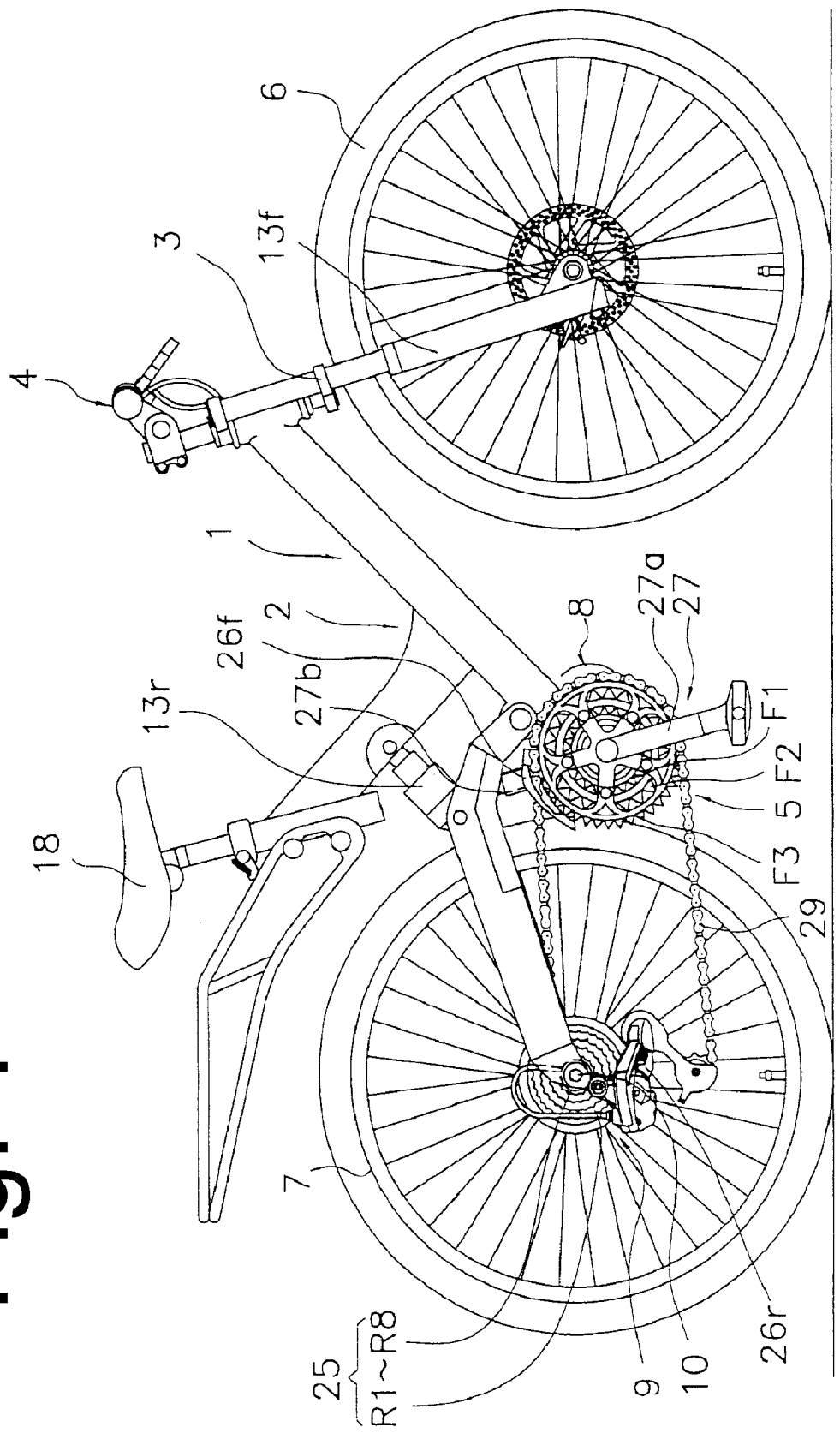
FIG. 1 is a side view of a particular embodiment of a bicycle.

FIG. 1 is a side view of a particular embodiment of a bicycle 1. Bicycle 1 is a mountain bicycle that comprises a frame body 2 constructed by welding together tubing having different cross-sections. A front fork 3 is mounted to the front of frame body 2 for rotation around an inclined axis, and a handlebar assembly 4 is mounted to the top of front fork 3. A saddle 18 is mounted to the upper middle part of frame body 2, a drive mechanism 5 is mounted to the lower part of frame body 2, a front wheel 6 is rotatably mounted to the bottom of front fork 3, and a rear wheel 7 having a hub dynamo 10 is rotatably mounted to the rear of frame body 2. Hub dynamo 10 houses an alternating current generator 19 (not shown) for generating electricity through rotation of rear wheel 7. A front transmission 8 including a control device such as a front derailleur 26f is mounted to the lower middle part of frame body 2, and a rear transmission 9 including a control device such as a rear derailleur 26r is mounted to the rear of frame body 2. A front suspension 13f is mounted to front fork 3, and a rear suspension 13r is mounted between stationary and articulated portions of frame body 2.

Figure 2:
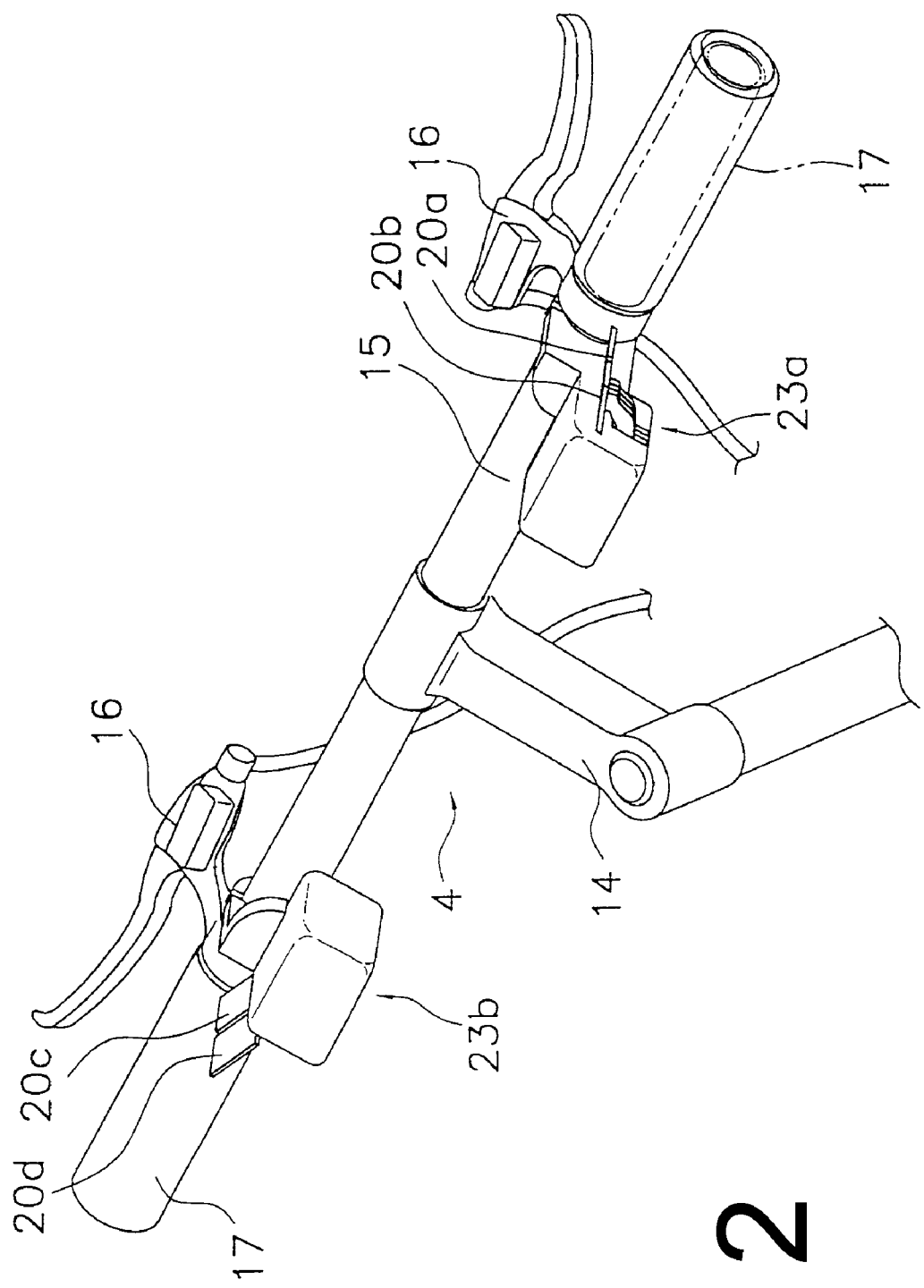
FIG. 2 is a more detailed view of the handlebar assembly.

As shown in FIG. 2, handlebar assembly 4 comprises a handle stem 14 mounted to the top of front fork 3 and a handlebar 15 mounted to the top of handle stem 12. Brake lever assemblies 16 and grips 17 are mounted at the opposite ends of handlebar 15. The right side brake lever assembly 16 includes a self-powered rear electrical shift apparatus 23a that includes a rear downshift switch 20a that provides control signals to manually downshift rear derailleur 26r in single increments and a rear upshift switch 20b that provides control signals to manually upshift rear derailleur 26r in single increments. A rear shift control unit 11 (FIG. 6) receives the control signals and provides signals to move rear derailleur 26r in response to the control signals. The left side brake lever assembly 16 includes a self-powered front electrical shift apparatus 23b that includes a front downshift switch 20c that provides control signals to manually downshift front derailleur 26f in single increments and a front upshift switch 20d that provides control signals to manually upshift front derailleur 26f in single increments. A front shift control unit 12 (FIG. 6) receives the control signals and provides signals to move front derailleur 26f in response to the control signals.

As shown in FIG. 1, drive mechanism 5 comprises a crank 27 rotatably mounted at the bottom bracket of frame body 2, front and rear transmissions 8 and 9, and a chain 29. Front transmission 8 comprises, for example, three front sprockets F1-F3 and front derailleur 26f. Front sprockets F1-F3 are mounted to crank 27, and front derailleur 26f is mounted on frame body 2. Rear transmission 9 comprises, for example, a multiple sprocket assembly 25 having eight rear sprockets R1-R8 and rear derailleur 26r. Multiple sprocket assembly 25 is mounted to rear wheel 7 and rear derailleur 26r is mounted at the back of frame body 2. Crank 27 comprises a right crank arm 27a and a left crank arm 27b, wherein front sprockets F1-F3 are mounted to right crank arm 27a. Chain 29 engages one of the front sprockets F1-F3 and one of the rear sprockets R1-R8.

Front sprockets F1-F3 are arranged in the order of an increasing number of teeth, wherein front sprocket F1 is the laterally innermost front sprocket having the least number of teeth, and front sprocket F3 is the laterally outermost front sprocket having the most number of teeth. Rear sprockets R1-R8 are arranged in the order of a decreasing number of teeth, wherein rear sprocket R1 is the laterally innermost rear sprocket having the most number of teeth, and rear sprocket R8 is the laterally outermost rear sprocket having the least number of teeth.

A rotation sensor (not shown) is provided for sensing the rotation of crank 27. The presence or absence of rotation of crank 27 ordinarily is used in part to control the operation of front and rear transmissions 8 and 9. For example, derailleurs cannot shift properly when crank 27 is stationary, so any requested operation of a derailleur may be delayed until crank 27 is rotating. A rotation sensor typically comprises a reed switch mounted to frame body 2 and one or more magnets (not shown) mounted to one of the crank arms 27a and 27b so that reed switch 23 provides a pulse whenever the magnet passes by.

The hub dynamo 10 at rear wheel 7 is structured to mount a disk brake rotor as well as multiple sprocket assembly 25. Hub dynamo 10 generates alternating current in response to rotation of rear wheel 7. A power supply circuit that converts the alternating current into direct current and stores it is incorporated into hub dynamo 10. The stored power is used to operate front and rear derailleurs 26f and 26r.

Figure 3:
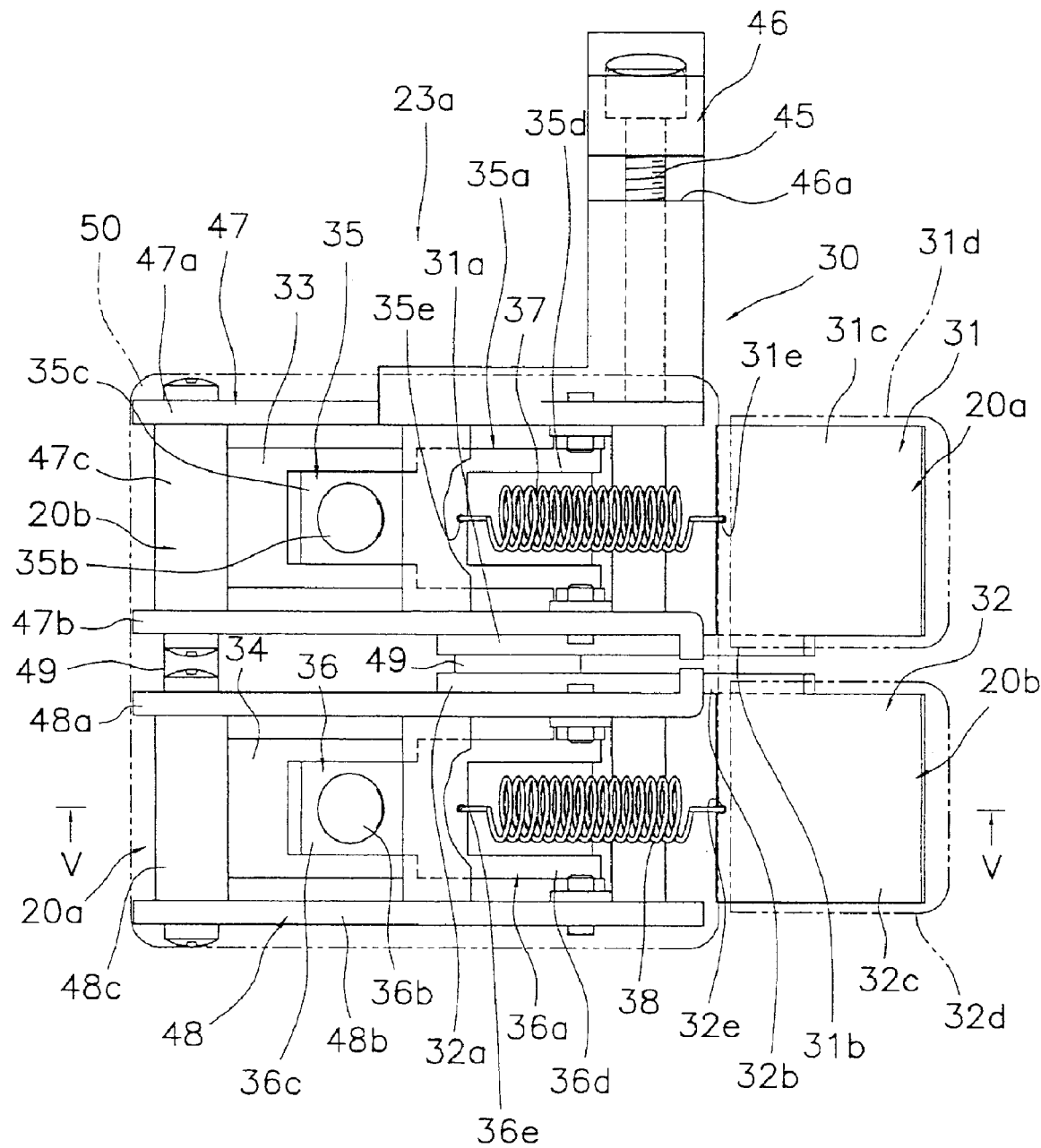
FIG. 3 is a plan view of a particular embodiment of an electrical switch apparatus.
Figure 4:
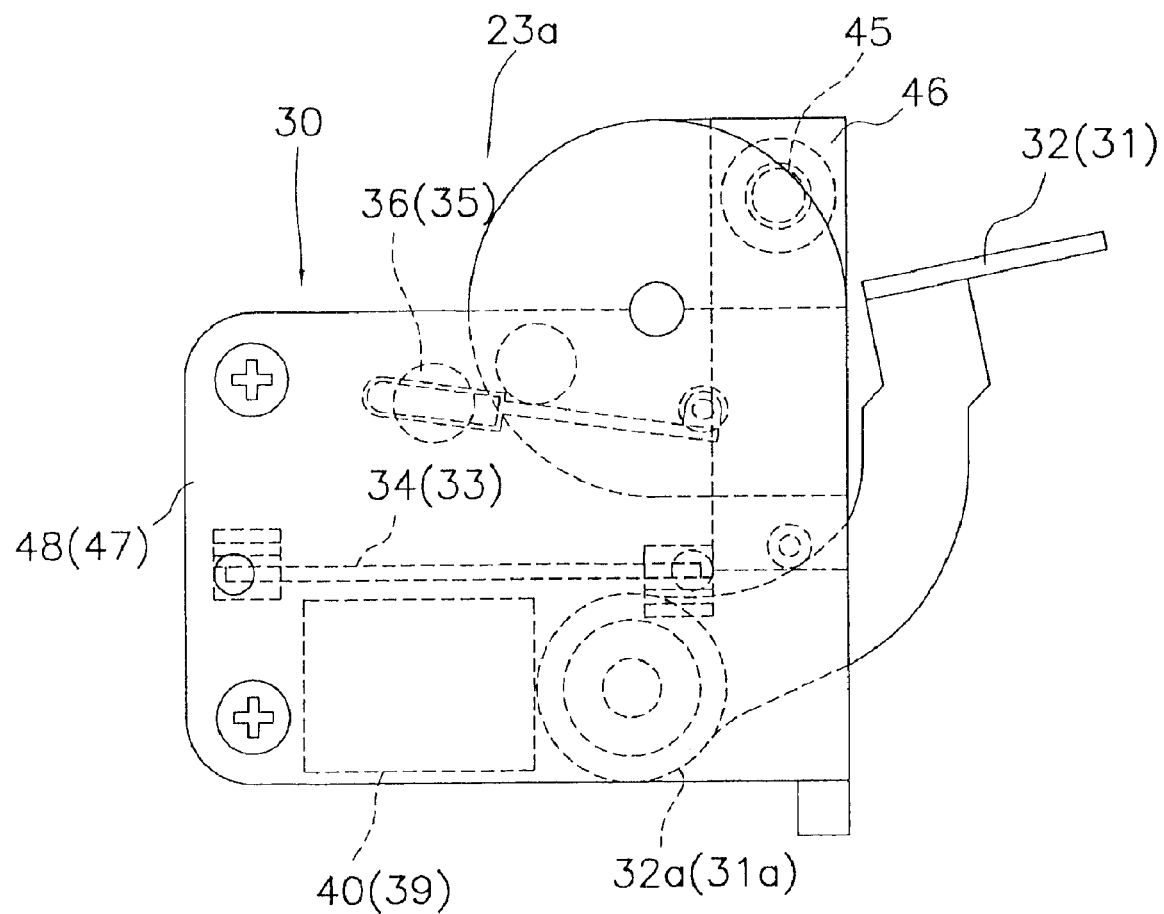
FIG. 4 is a side view of the electrical switch apparatus.
Figure 5:
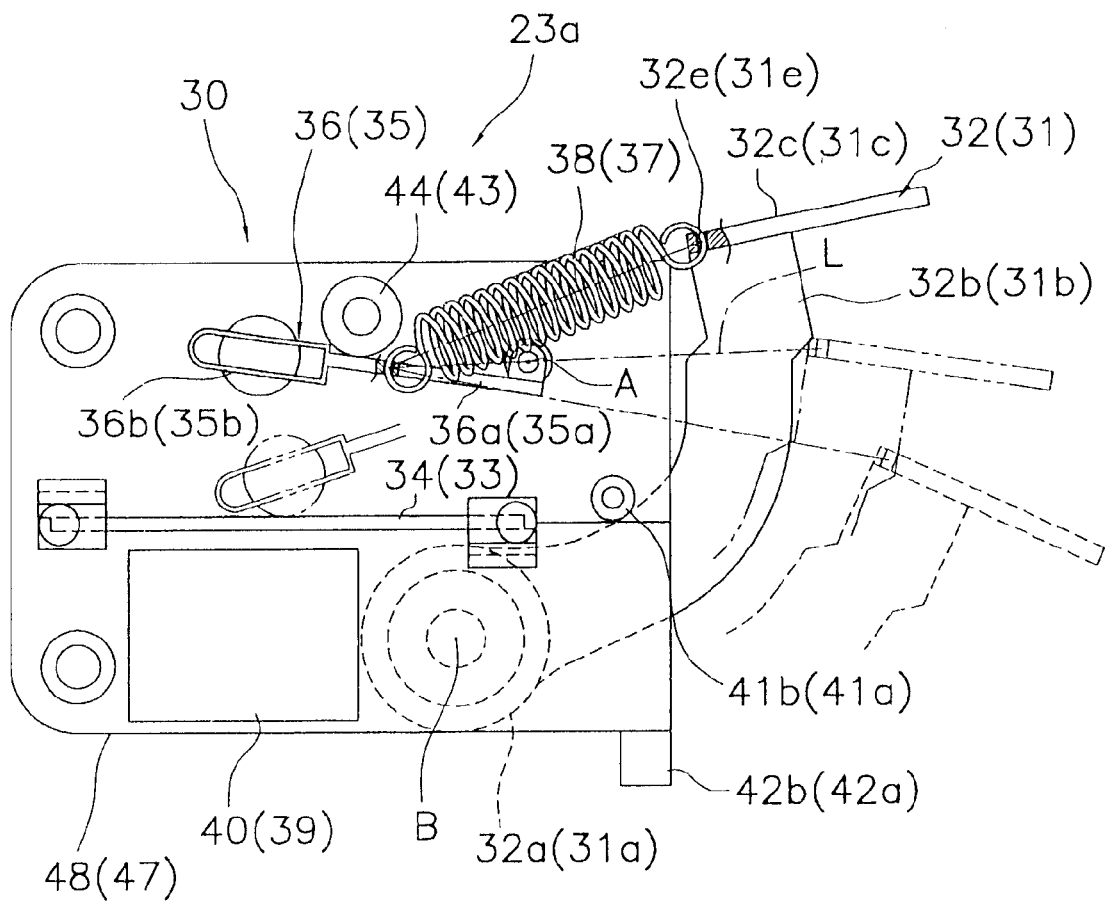
FIG. 5 is a view taken along line V-V in FIG. 3.

Rear electrical shift apparatus 23a and front electrical shift apparatus 23b are constructed to be laterally symmetrical, so only front electrical shift apparatus 23a will be described in detail. As shown in FIGS. 3-5, rear electrical shift apparatus 23a includes a mounting member 30 structured to be mounted to handlebar 15 of the bicycle. Mounting member 30 supports first and second operating members in the form of first and second operating levers 31 and 32. Each operating lever 31 and 32 moves between an operating member start position (shown by a solid line in FIG. 5) and an operating member operating position (shown by a broken line in FIG. 5). Mounting member 30 also supports electrical elements in the form of first and second piezoelectric elements 33 and 34 and contact members in the form of first and second striking members 35 and 36. Each striking member 35 and 36 moves between a striking member start position (shown by a solid line in FIG. 5) and a striking member striking position (shown by a broken line in FIG. 5) to strike a respective piezoelectric element 33 or 34 when a corresponding operating lever 31 or 32 moves from the operating member start position to the operating member operating position. In this embodiment, this is accomplished by mounting respective biasing units in the form of first and second biasing members 37 and 38 between first and second striking members 35 and 36 and first and second operating levers 31 and 32 in a manner described below. First and second wireless (e.g., radio signal) transmitters 39 and 40 (FIG. 6) are connected to first and second piezoelectric elements 33 and 34, respectively, to transmit corresponding first and second shift control signals in response to voltage generated by first and second piezoelectric elements 33 and 34. In this embodiment, signals transmitted by first wireless transmitter 39 are used as downshift control signals for downshifting rear derailleur 26r one step at a time, and signals transmitted by second wireless transmitter 40 are used as upshift control signals for upshifting rear derailleur 26r one step at a time.

Similarly, front electrical shift apparatus 23b includes a similar mounting member, third and fourth operating levers, third and fourth striking members, third and fourth biasing members, third and fourth piezoelectric elements 63 and 64 (FIG. 6), and third and fourth wireless transmitters 69 and 70. Signals transmitted by third wireless transmitter 39 are used as downshift control signals for downshifting front derailleur 26f one step at a time, and signals transmitted by fourth wireless transmitter 40 are used as upshift control signals for upshifting front derailleur 26f one step at a time.

As shown more particularly in FIG. 3, mounting member 30 includes a handlebar mounting member 46 that can be fastened and fixed to handlebar 15 by a fixing bolt 45, a first mounting frame 47 formed integrally with handlebar mounting member 46, and a second mounting frame 48 formed integrally with handlebar mounting member 46. Handlebar mounting member 46 has a substantially circular shape to surround handlebar 15. A slit 46a is formed in a side of handlebar mounting member 46, and fixing bolt 45 is mounted in handlebar mounting member 46 across slit 46a in a known manner. Fixing bolt 45 is used to narrow slit 46a so that handlebar mounting member 46 can be fixed at a desired position on handlebar 15.

First and second mounting frames 47 and 48 are constructed by parallel pairs of rectangular side plates 47a, 47b and 48a, 48b, wherein side plates 47a and 47b are connected to each other by connecting member 47c, and side plates 48a and 48b are connected to each other by connecting member 48. Side plates 47b and 48a are connected to each other by connecting member 49. First operating lever 31, first piezoelectric element 33 and first striking member 35 are mounted to first mounting frame 47 between side plates 47a and 47b, and second operating lever 32, second piezoelectric element 34 and second striking member 36 are mounted to second mounting frame 48 between side plates 48a and 48b.

In this embodiment, first and second operating levers 31 and 32 are mounted to first and second mounting frames 47 and 48 for coaxial rotation around a rotational axis B (FIG. 5). First and second operating levers 31 and 32 are formed by bending planar members to form respective first and second base portions 31a and 32a, first and second arm portions 31b and 32b that curve radially outwardly and upwardly from their respective first and second base portions 31a and 32a, and substantially rectangular first and second operating portions 31c and 32c that bend in opposite lateral directions from the radially outer ends of their respective first and the second arm portions 31*b* and 32*b*. First and second synthetic resin cover members 31*d* and 32*d*, shown by chain lines in FIG. 3, cover the first and second operating portions 31*c* and 32*c*.

A stopper 41*a* is mounted to first mounting frame 47 to set first operating lever 31*a* at the first operating member start position, and a stopper 42*a* is mounted to first mounting frame 47 to limit movement of first operating lever 31 in the direction of the first operating member operating position. Similarly, a stopper 41*b* is mounted to second mounting frame 48 to set second operating lever 32 at the second operating member start position, and a stopper 42*b* is mounted to second mounting frame 48 to limit movement of second operating lever 32 in the direction of the second operating member operating position. Mounting frames 47 and 48 are together covered by a synthetic resin cover member 50 as shown by the broken line in FIG. 3.

As is well known, a piezoelectric element has the ability to generate a voltage when a mechanical force is applied to it. In this embodiment, first and second piezoelectric elements 33 and 34 generate voltage or power as a result of vibration caused by impact, and they are mounted to first and second mounting frames 47 and 48, respectively, slightly below the vertical centers of first and second mounting frames 47 and 48. Signals generated by first and second piezoelectric elements 33 and 34 are communicated to first and second transmitters 39 and 40, respectively.

Piezoelectric elements have been used in switches. For example, Japanese Patent No. 3,616,386 discloses a switch that uses a piezoelectric element to turn lighting on and off in a building. The switch comprises a spring plate, a piezoelectric element bonded to the spring plate, and an L-shaped operating lever. The spring plate is supported in a cantilevered manner to an attachment component. The bottom leg of the operating lever faces the free end of the spring plate such that the bottom leg can move in a direction substantially perpendicular to the long axis of the spring plate. The bottom leg of the operating lever has a projection that causes the free end of the spring plate to vibrate as the bottom leg moves past the free end of the spring plate, thereby vibrating the piezoelectric element. The signal generated by the piezoelectric element is output by a signal transmitter to a circuit that controls the building lighting. However, since some bicycles vibrate significantly during riding, a cantilevered piezoelectric element could vibrate regardless of whether or not the operating lever is operated, thereby causing the controlled device to malfunction. Furthermore, since the spring plate vibrates significantly during operation, frequent operation of the switch could cause the spring plate to lose elasticity or to break. To provide superior characteristics, each piezoelectric element 33 and 34 in the present embodiment is fixed at both ends to avoid unnecessary vibration.

As shown in FIGS. 3 and 5, first striking member 35 comprises a pair of first base portions 35*d* mounted at the inner side surfaces of side plates 47*a* and 47*b* for coaxial rotation around a rotational axis A above first piezoelectric element 33, a pair of first swing arm portions 35*a* that extend radially outwardly from first base portions 35*d*, a first tip portion 35*c* supported to the ends of first swing arm portions 35*a*, and a first striking portion 35*b* fixed to first tip portion 35*c*. Similarly, second striking member 36 comprises a pair of first base portions 36*d* mounted at the inner side surfaces of side plates 48*a* and 48*b* for coaxial rotation around rotational axis A above second piezoelectric element 34, a pair of second swing arm portions 36*a* that extend radially outwardly from second base portions 36*d*, a second tip portion 36*c* supported to the ends of second swing arm portions 36*a*, and a second striking portion 36*b* fixed to second tip portion 36*c*. First and second striking portions 36*a* and 36*b* may be formed by steel balls fixed to their respective tip portions 35*c* and 36*c*, for example. A stopper 43 is mounted to first mounting frame 47 to set first striking member 31 to its striking member start position, and a stopper 44 is mounted to second mounting frame 48 to set second striking member 36 to its striking member start position.

First biasing member 37 comprises a first coil spring having a first end inserted into an opening 31*e* formed in first operating lever 31 and a second end inserted into an opening 35*e* formed in first striking member 35. Similarly, second biasing member 38 comprises a second coil spring having a first end inserted into an opening 32*e* formed in second operating lever 32 and a second end inserted into an opening 36*e* formed in second striking member 36.

As shown in FIG. 5, first and second biasing members 37 and 38 are disposed above rotational axis B, and first and second biasing members 37 and 38 extend to the left from first and second operating levers 31 and 32. As a result, first and second operating levers 31 and 32 are biased counterclockwise to their corresponding start positions against stoppers 41*a* and 41*b*. The counterclockwise biasing forces remain throughout the movement of first and second operating levers 31 and 32 from their start positions to their operating positions, and the biasing forces increase as a result of the lengthening of biasing members 37 and 38 as first and second operating levers 31 and 32 rotate clockwise.

First and second piezoelectric elements 33 and 34 are vertically disposed between rotational axes A and B. Vectors of biasing force L applied to first and second striking members 35 and 36 by biasing members 37 and 38 are disposed above rotational axis A when first and second operating levers 31 and 32 are disposed at their operating member start positions, whereas vectors of biasing force L applied to first and second striking members 35 and 36 by biasing members 37 and 38 are disposed below rotational axis A when first and second operating levers 31 and 32 are disposed at their operating member operating positions. As a result, first and second striking members 35 and 36 are biased clockwise when first and second operating levers 31 and 32 are disposed at their operating member start positions, whereas first and second striking members 35 and 36 are biased counterclockwise when first and second operating levers 31 and 32 are disposed at their operating member operating positions. Thus, when first and second operating levers 31 and 32 are pressed from their operating member start positions towards their operating member operating positions, first and second biasing members 37 and 38 switch the rotational direction of the vector of biasing force L at some intermediate point shown by the intermediate chain line in FIG. 5 when the vector of biasing force crosses rotational axis A. At this time, first and second striking members 35 and 36 are biased and move toward their striking positions.

When first and second operating levers 31 and 32 are released, first and second biasing members 37 and 38 bias their respective first and second operating levers 31 and 32 toward their corresponding operating member start positions. When first and second operating levers 31 and 32 reach the intermediate point and the vector of biasing force L again crosses rotational axis A shown by the intermediate chain line in FIG. 5, first and second biasing members 37 and 38 switch the rotational direction of the vector of biasing force L to bias first and second striking members 37 and 38 back toward their striking member start positions. Since the vector of biasing force L does not cross rotational axis B during the entire range of motion of first and second operating levers 31 and 32, first and second operating levers 31 and 32 always are biased counterclockwise toward their operating member start positions.

Figure 6:
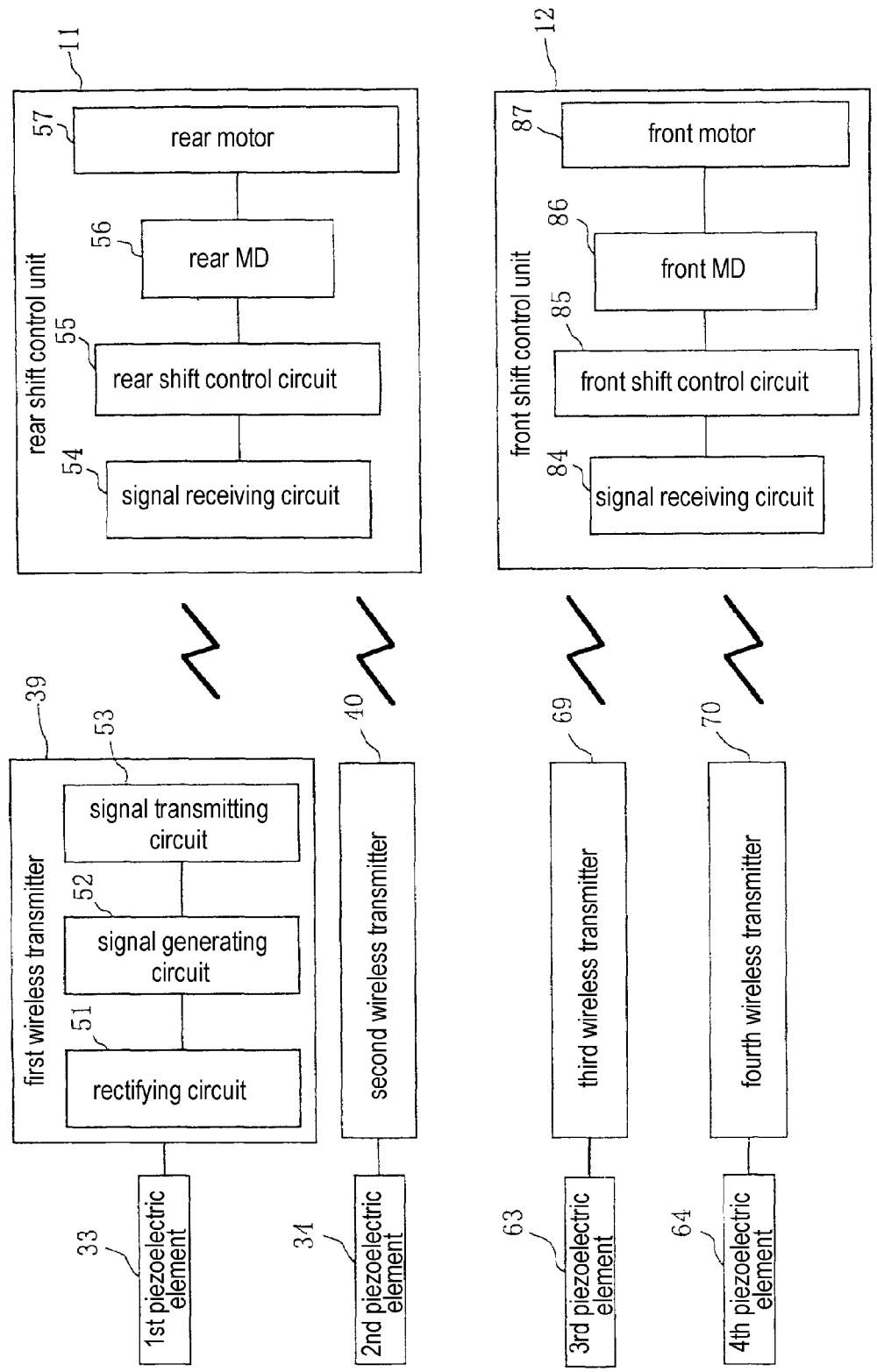
FIG. 6 is a block diagram of an apparatus that controls the operation of a bicycle transmission

As shown in FIG. 6, first wireless transmitter 39 comprises a rectifying circuit 51 that rectifies current generated by first piezoelectric element 33, a signal generating circuit 52 that generates a modulated (e.g., by frequency, voltage, pattern, etc) rear downshift signal for commanding single downshifts of rear derailleur 26r, and a signal transmitting circuit 53 that outputs a wireless (e.g., RF) rear downshift signal. The second through fourth wireless transmitters 40, 69 and 70 include similar rectifying circuits, signal generating circuits and signal transmitting circuits and transmit rear upshift signals, front downshift signals and front upshift signals, respectively, that may have different modulation characteristics. Second wireless transmitter 40 is provided at rear electrical switch apparatus 23a, whereas third and fourth wireless transmitters 69 and 70 are provided at front electrical switch apparatus 23b.

Rear shift control unit 11 for rear derailleur 26r comprises a signal receiving circuit 54 that receives the rear downshift and upshift signals from first and second wireless transmitters 39 and 40, a rear shift control circuit 55 that controls rear derailleur 26r in accordance with the received signals, a rear motor driver (MD) 56 that is controlled by rear shift control circuit 55, and a rear motor 57 that is driven by rear motor driver 56. Rear motor 57 controls the movement of rear derailleur 26r in a known manner, such as by swinging a link of rear derailleur 26r. Similarly, a front shift control unit 12 for front derailleur 26f comprises a signal receiving circuit 84 that receives the front downshift and upshift signals from third and fourth wireless transmitters 69 and 70, a front shift control circuit 85 that controls front derailleur 26f in accordance with the received signals, a front motor driver (MD) 86 that is controlled by front shift control circuit 85, and a front motor 87 that is driven by front motor driver 86. Front motor 87 controls the movement of front derailleur 26f in a known manner, such as by swinging a link of front derailleur 26.

Thus, when first operating lever 31 of rear electrical switch apparatus 23a is rotated from the first operating member start position toward the first operating member operating position, the vector of biasing force L of first biasing member 37 crosses rotational axis A of first striking member 35 at some intermediate point, first striking member 35 then is biased toward the first striking member striking position by first biasing member 37, and first striking portion 35b strikes first piezoelectric element 33. At that time, first piezoelectric element 33 generates electric current that is rectified by rectifying circuit 51 of first wireless transmitter 39, signal generating circuit 52 generates a rear downshift signal using the electric power from first piezoelectric element 33 as a power supply, and the rear downshift signal is output wirelessly to rear shift control unit 11. Rear shift control circuit 55 decodes the signal as a rear downshift signal and outputs a signal to rear motor driver (56) to cause rear motor 57 to downshift rear derailleur 26r by one gear. Operation of second operating lever 32 causes rear derailleur to 26r to upshift in a similar manner.

Since first biasing member 37 biases multiple components, the overall structure is simple and enhances reliability and durability. Furthermore, since movement of first striking member 35 is caused by the biasing force of first biasing member 37, the force at which first striking portion 35b collides against first piezoelectric element 33 is substantially constant regardless of the speed of first operating lever 31 toward the first operating member operating position or the force applied to first operating lever 31. As a result, first piezoelectric element 33 generates substantially the same amount of electric power regardless of how first operating lever 31 is operated. Consequently, the operations of rectifying circuit 51 and signal generating circuit 52 of wireless transmitter 39 are stabilized, and potential malfunctions are minimized. The same is true of the other components.

Since both ends of first and second piezoelectric elements 33 and 34 are fixed to mounting member 30, first and second piezoelectric elements 33 and 34 do not have free ends, so there is less risk that piezoelectric elements 33 and 34 may vibrate due to vibrations of the bicycle and thereby generate spurious shift commands. Since first and second piezoelectric elements 33 and 34 are not fitted to swinging spring plates, first and second piezoelectric elements 33 and 34 do not bend significantly during each switch operation, so the risk of failure caused by frequent operation is minimized.

While the above is a description of various embodiments of inventive features, further modifications may be employed without departing from the spirit and scope of the present invention. For example, while two operating levers 31 and 32 were disposed in one switch apparatus 23 a in the described embodiment, the construction of the operating levers, the accompanying piezoelectric elements and the like is not limited to two operating levers for one switch apparatus. Other electrical switch apparatuses may have one lever, or three or more. While first and second operating levers 31 and 32 rotated coaxially around rotational axis B, first and second operating levers 31 and 32 may rotate around different axes. For example, second operating lever 32 may rotate around a rotational axis disposed at an upper portion of mounting member 30, in which case second operating lever 32 may swing upwardly from below. First and second operating levers 31 and 32 may rotate around separate axes that intersect or otherwise are inclined relative to each other.

The size, shape, location or orientation of the various components may be changed as desired. Components that are shown directly connected or contacting each other may have intermediate structures disposed between them. The functions of one element may be performed by two, and vice versa. The function of one element may be performed by another, and functions may be interchanged among the elements. The structures and functions of one embodiment may be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the scope of the invention should not be limited by the specific structures disclosed or the apparent initial focus or emphasis on a particular structure or feature.

What is claimed is:

1. An electrical switch apparatus for a bicycle control device comprising:
    a mounting member structured to be mounted to a bicycle;
    a first operating member supported by the mounting member for movement between a first operating member start position and a first operating member operating position;
    a first piezoelectric element supported by the mounting member; and
    a first striking member supported by the mounting member for movement between a first striking member start position and a first striking member striking position;
    wherein the first striking member is operatively coupled to the first operating member such that the first striking member moves from the first striking member start position to the first striking member striking position to strike the first piezoelectric element in response to movement of the first operating member from the first operating member start position to the first operating member operating position.

2. The apparatus according to claim 1 wherein the first operating member is pivotably supported to the mounting member.

3. The apparatus according to claim 2 wherein the first operating member comprises a lever having an exposed finger contact member.

4. The apparatus according to claim 1 wherein the first striking member is pivotably supported to the mounting member.

5. The apparatus according to claim 4 wherein the first striking member comprises a lever having a striking portion for striking the first piezoelectric element.

6. The apparatus according to claim 1 wherein the first operating member is supported to the mounting member for pivoting around a first axis, wherein the first striking member is supported to the mounting member for pivoting around a second axis, and wherein the first axis is different from the second axis.

7. The apparatus according to claim 6 wherein the first axis is parallel to the second axis.

8. The apparatus according to claim 6 wherein the first piezoelectric element is disposed between the first axis and the second axis when viewed along at least one of the first axis and the second axis.

9. The apparatus according to claim 1 further comprising a first operating member biasing unit that biases the first operating member toward the first operating member start position.

10. The apparatus according to claim 1 further comprising a first striking member biasing unit that biases the first striking member toward the first striking member start position.

11. The apparatus according to claim 1 further comprising a biasing unit that biases the first operating member relative to the first striking member.

12. The apparatus according to claim 11 wherein the first striking member is supported to the mounting member for pivoting around an axis, and wherein a vector of biasing force applied to the first striking member crosses over the axis as the first operating member moves from the first operating member start position to the first operating member operating position.

13. The apparatus according to claim 11 wherein the biasing unit biases the first operating member toward the first operating member start position and biases the first striking member toward the first striking member start position.

14. The apparatus according to claim 13 wherein the biasing unit is coupled such that the biasing unit biases the first striking member toward the first striking member striking position when the first operating member is at the first operating member operating position.

15. The apparatus according to claim 14 wherein the biasing unit changes from biasing the first striking member toward the first striking member start position to biasing the first striking member toward the first striking member striking position as the first operating member moves from the first operating member start position toward the first operating member operating position.

16. The apparatus according to claim 15 wherein the biasing unit comprises a spring coupled to the first operating member and to the first striking member.

17. The apparatus according to claim 16 wherein a biasing force of the spring applied to the first operating member increases as the first operating member moves toward the first operating member operating position.

18. The apparatus according to claim 17 wherein the biasing force of the spring applied to the first operating member remains in a direction of the first operating member start position throughout movement of the first operating member from the first operating member start position to the first operating member operating position.

19. The apparatus according to claim 16 wherein a biasing force of the spring applied to the first striking member increases as the first operating member moves toward the first operating member operating position.

20. The apparatus according to claim 1 wherein the piezoelectric element has a first end secured to a first support structure, wherein the first piezoelectric element has a second end secured to a second support structure, and wherein the first striking member strikes the first piezoelectric element at a location between the first end and the second end.

21. The apparatus according to claim 1 further comprising a wireless transmitter that outputs a wireless control signal in response to movement of the first piezoelectric element when the first striking member strikes the first piezoelectric element.

22. The apparatus according to claim 21 wherein the wireless control signal comprises one of an upshift signal or a downshift signal for a bicycle transmission.

23. The apparatus according to claim 1 further comprising:
a second operating member supported by the mounting member for movement between a second operating member start position and a second operating member operating position;
a second piezoelectric element supported by the mounting member; and
a second striking member supported by the mounting member for movement between a second striking member start position and a second striking member striking position;
wherein the second striking member is operatively coupled to the second operating member such that the second striking member moves from the second striking member start position to the second striking member striking position to strike the second piezoelectric element in response to movement of the second operating member from the second operating member start position to the second operating member operating position.

24. The apparatus according to claim 23 further comprising:
a first wireless transmitter that outputs a wireless upshift signal for a bicycle transmission in response to movement of the first piezoelectric element when the first striking member strikes the first piezoelectric element; and
a second wireless transmitter that outputs a wireless downshift signal for the bicycle transmission in response to movement of the second piezoelectric element when the second striking member strikes the second piezoelectric element.

25. An electrical switch apparatus for a bicycle control device comprising:
a mounting member structured to be mounted to a bicycle;
an operating member supported by the mounting member for movement between an operating member start position and an operating member operating position;
an electrical element supported by the mounting member;

a contact member supported by the mounting member for movement between a contact member start position and a contact member contacting position;

a biasing unit that applies a vector of biasing force to the contacting member;

wherein the biasing unit is operatively coupled to the operating member such that the contact member moves from the contact member start position to the contact member contacting position to move the electrical element in response to movement of the operating member from the operating member start position to the operating member operating position;

wherein the contact member is supported to the mounting member for pivoting around an axis; and wherein the vector of biasing force applied to the contact member crosses over the axis as the operating member moves from the operating member start position to the operating member operating position.

26. An electrical switch apparatus that controls movement of a moving bicycle control device, wherein the apparatus comprises:

a mounting member structured to be mounted to a bicycle;

an operating member supported by the mounting member for movement between an operating member start position and an operating member operating position;

a piezoelectric element supported by the mounting member;

wherein the operating member causes the piezoelectric element to move and generate a control signal for the bicycle control device when the operating member moves to the operating member operating position; and a control circuit that receives the control signal and provides a signal to move the bicycle control device in response to the control signal.

* * * * *